(12) United States Patent
Meroni et al.

(10) Patent No.: US 7,228,947 B2
(45) Date of Patent: Jun. 12, 2007

(54) METHOD AND TOOLS FOR THE PRODUCTION OF A BRAKING BAND FOR A BRAKE DISK

(75) Inventors: Giuseppe Meroni, Lecco (IT); Simone Ravasio, Barzana (IT); Leone Oberti, Lenna (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 0 days.

(21) Appl. No.: 10/479,052

(22) PCT Filed: May 28, 2001

(86) PCT No.: PCT/IT01/00273

§ 371 (c)(1),
(2), (4) Date: Nov. 26, 2003

(87) PCT Pub. No.: WO02/097291

PCT Pub. Date: Dec. 5, 2002

(65) Prior Publication Data

US 2004/0149420 A1    Aug. 5, 2004

(51) Int. Cl.
*F16D 65/847*    (2006.01)
(52) U.S. Cl. .................. 188/264 AA; 188/218 XL; 164/200; 164/228
(58) Field of Classification Search ......... 188/218 XL, 188/264 R, 264 A, 264 B, 264 D; 164/134, 164/358, 369, 15, 19, 20, 21, 22, 37, 200, 164/201, 202, 339, 340, 132, 137, 228, 229, 164/230, 231
See application file for complete search history.

(56) References Cited

U.S. PATENT DOCUMENTS

| 2,368,621 | A | * | 2/1945 | Tack ................. 188/264 A |
| 2,451,709 | A | * | 10/1948 | Baselt ............... 188/264 A |
| 5,228,495 | A | | 7/1993 | Metzler et al. |
| 5,503,214 | A | * | 4/1996 | Cribley et al. .......... 164/134 |
| 5,878,479 | A | | 3/1999 | Dickerson et al. |
| 6,945,309 | B2 | * | 9/2005 | Frait et al. ............ 164/132 |
| 2003/0159893 | A1 | * | 8/2003 | Tironi ................ 188/71.1 |
| 2004/0159511 | A1 | * | 8/2004 | Meroni et al. ....... 188/218 XL |
| 2004/0163902 | A1 | * | 8/2004 | Meroni et al. ....... 188/218 XL |

FOREIGN PATENT DOCUMENTS

| DE | 2507264 A * | 9/1976 |
| DE | 4237372 A1 * | 5/1993 |
| DE | 9319489 U | 4/1994 |
| DE | 10119150 C1 * | 11/2002 |
| EP | 521754 A1 * | 1/1993 |

(Continued)

*Primary Examiner*—Thomas Williams
(74) *Attorney, Agent, or Firm*—Hogan & Hartson LLP

(57) ABSTRACT

The invention relates to a method and tools for producing a braking band (2) of a disk-brake disk (1) by casting, in which the disk comprises at least two plates (3, 3') connected to one another by connecting elements (4) forming an internal air-duct (7) for the cooling of the braking band (2). With the method and the tools, a disk is produced in which at least one of the plates (3, 3') has, in its surface (8, 8') defining the air-ducts (7), at least one groove (10, 10') having a cross-section which becomes wider towards the air-duct.

9 Claims, 19 Drawing Sheets

FOREIGN PATENT DOCUMENTS

| | | |
|---|---|---|
| EP | 1 048 872 A2 | 11/2000 |
| EP | 1 048 874 A1 | 11/2000 |
| EP | 1122456 A1 * | 8/2001 |
| GB | 1395290 A * | 5/1975 |
| JP | 58049545 | 3/1983 |

* cited by examiner

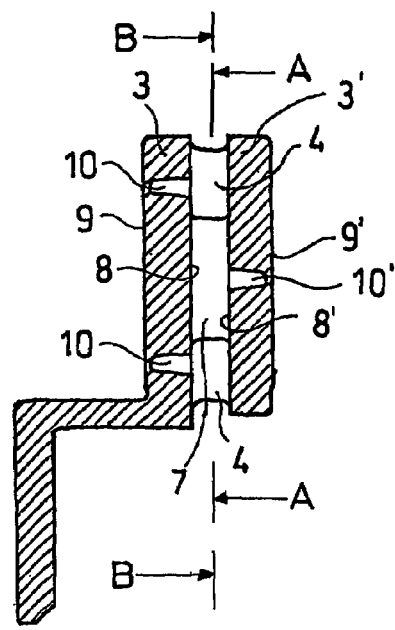
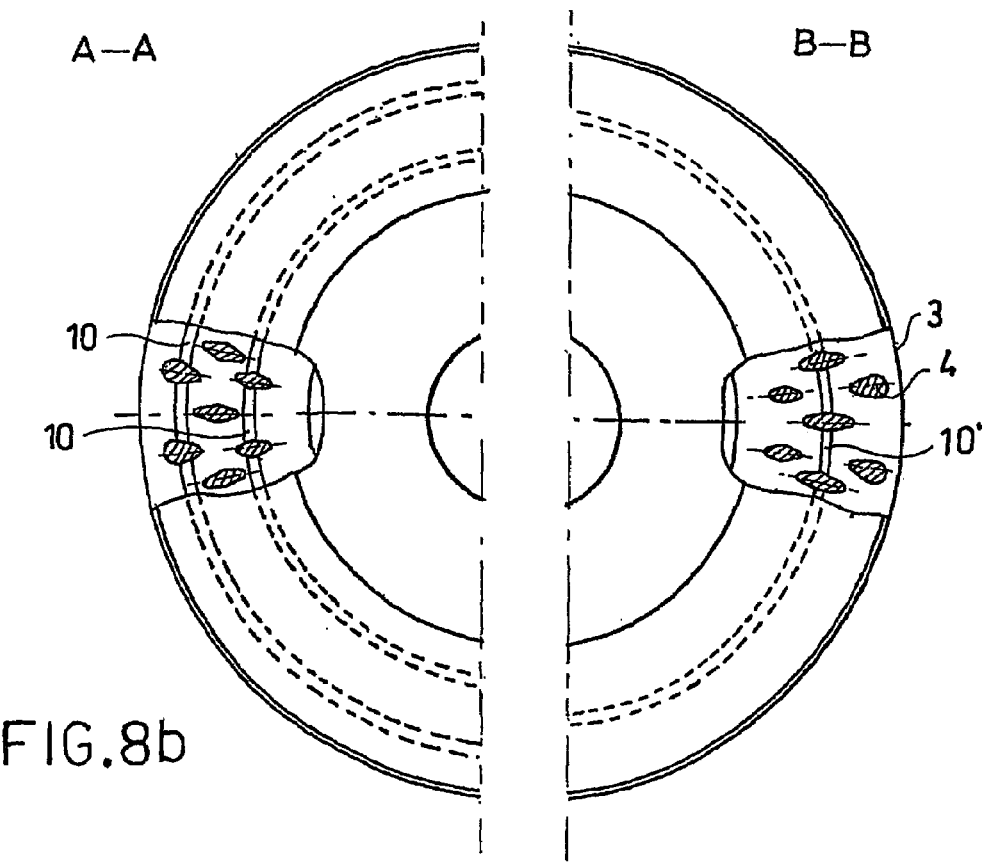

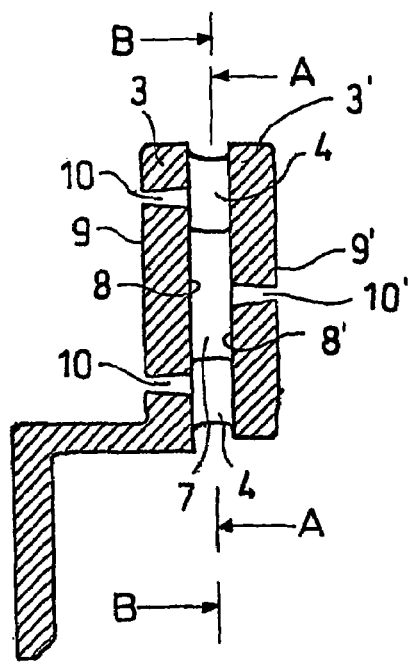
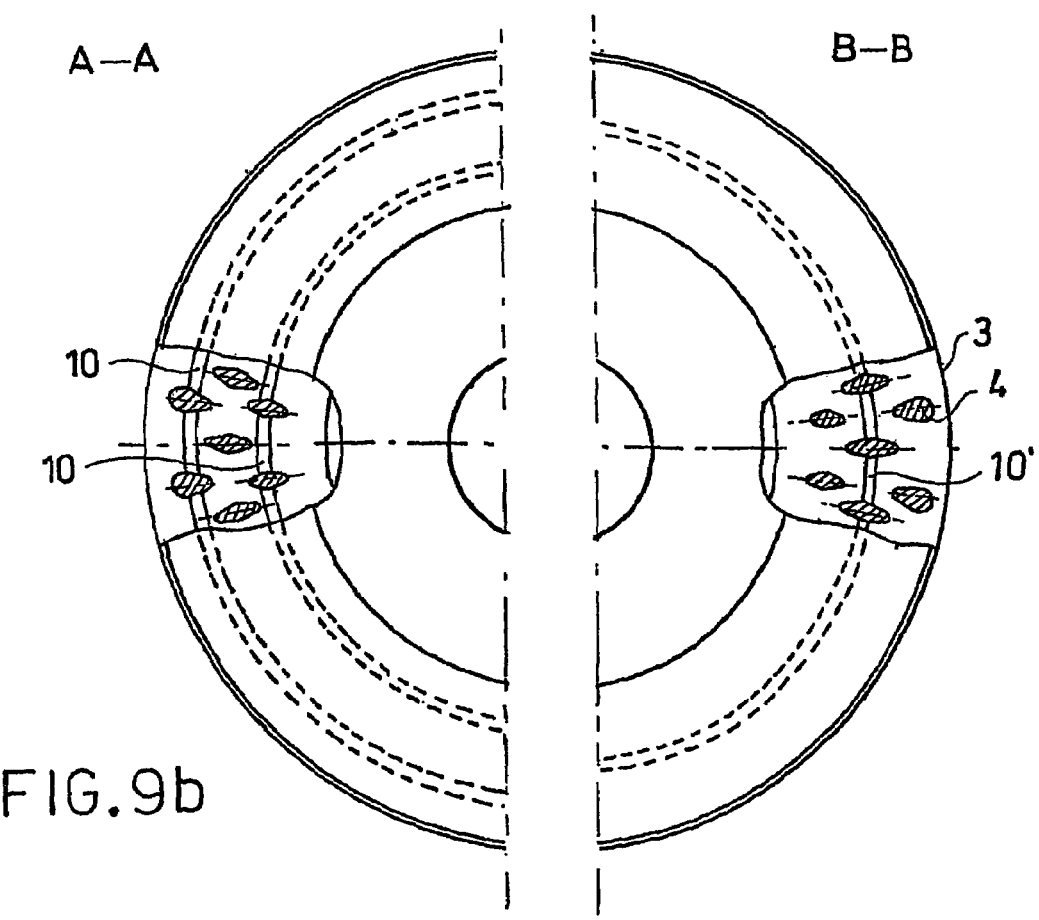

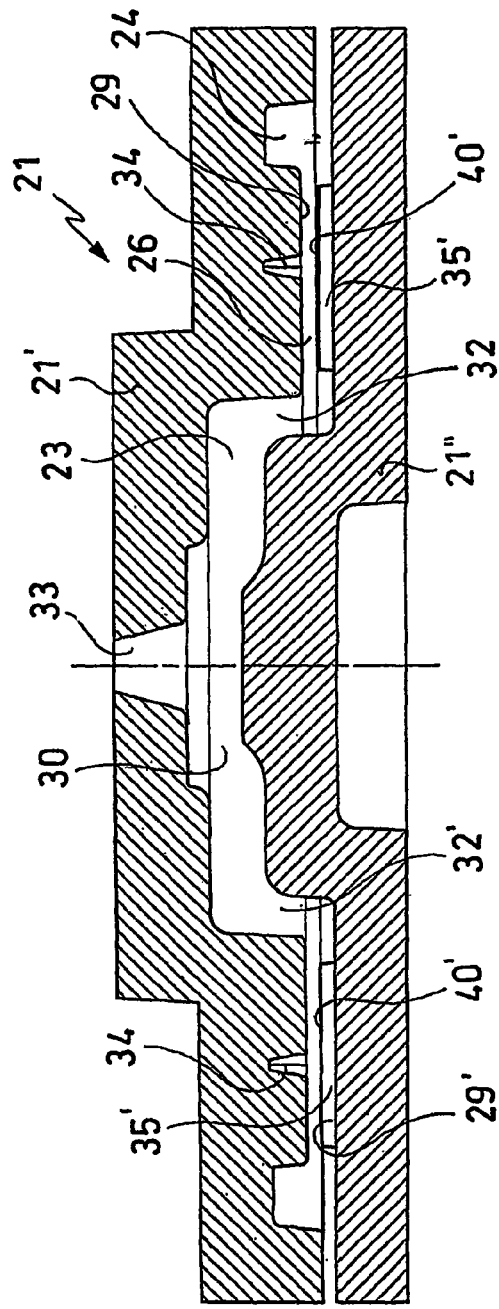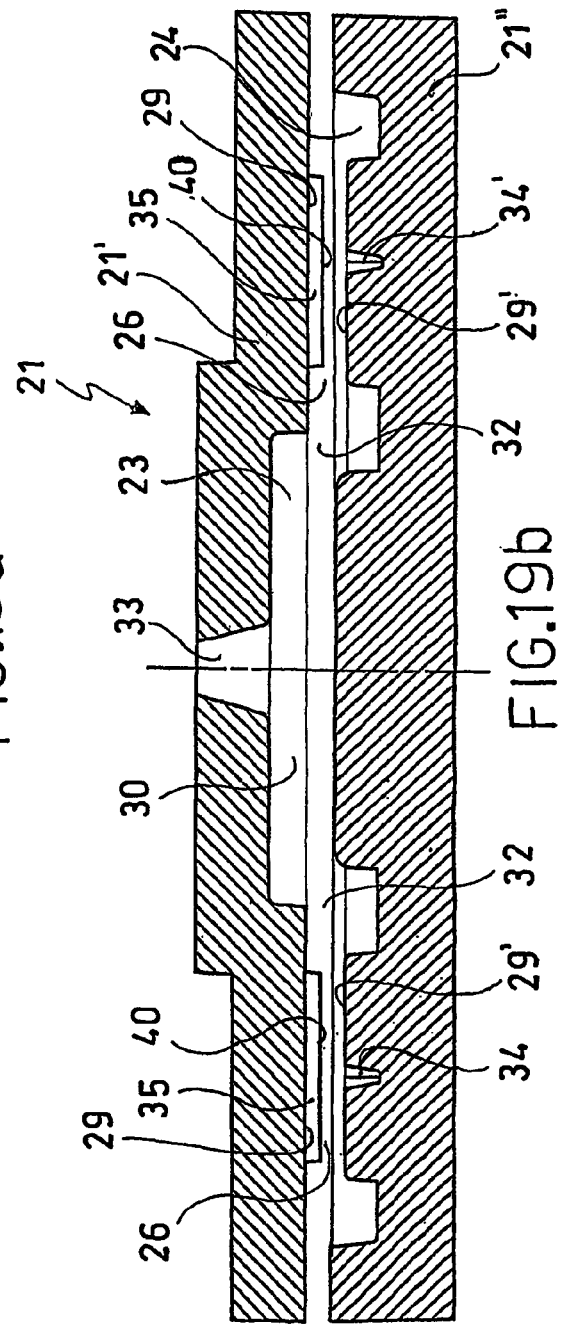

METHOD AND TOOLS FOR THE PRODUCTION OF A BRAKING BAND FOR A BRAKE DISK

The subject of the present invention is a method and tools for the production of a braking band of a disk for a self-ventilated disk brake.

A known type of disk-brake disk with a self-ventilated braking band comprises basically a support bell for connection, for example, to a vehicle wheel hub. The braking band, which cooperates with the calipers in order to exert the braking force on the vehicle, is connected to the bell by means of a connector. The braking band typically comprises at least two parallel plates separated by connecting elements which fix them together. The space between the plates forms an air duct. By virtue of the circulation of air between the plates, the disk is cooled, both on the outer sides of the braking band, as for a solid disk, and also on its inner sides.

As is known, during the braking operation, the disks may be subject to vibrations which translate into annoying squeals. A known approach for preventing this noise due to the vibrations of the brake disk consists in the formation of grooves which are produced in the braking surfaces of the braking band by turning and extend throughout the thickness of the plates. If the stiffness of the brake disk is thus changed locally, its dynamic characteristics are changed so as to move the natural frequencies of the brake disk away from the frequencies which are excited during braking.

However, these grooves in the braking surfaces of the braking band lead to technological and structural disadvantages which relate to the acoustic behaviour, to the production, and also to the mechanical behaviour of the disk, as well as to the type of pad required by a partially interrupted braking surface.

In fact, the production of a surface with a plurality of grooves produced by turning requires considerable expenditure in terms of time and cost.

When the aforementioned grooves which extend as far as the space between the two plates are produced by machining, starting from the outer surface, sharp edges are formed in the connecting elements between the plates and may introduce dangerous notching effects which in turn constitute stress raisers. Moreover, the connecting elements are weakened because of the inevitable removal of material from their ends when, during the machining of the through-grooves, starting from the outside and continuing towards the space between the plates, breakthrough takes place into the space.

The object of the present invention is therefore to propose a casting core for the production, by casting, of a braking band for a disk-brake disk having structural and functional characteristics such as to permit silent braking and to overcome the disadvantages mentioned above with reference to the prior art.

This object is achieved by a core for the production of a braking band of a disk-brake disk, the band having at least two plates connected to one another by connecting elements, in which the space between the plates forms an internal air-duct for the cooling of the braking band, characterized in that the core is suitable for forming, in at least one of the surfaces defining the air-ducts, at least one groove which extends substantially around a circle concentric with the axis of symmetry of the disk and has a cross-section which becomes wider, towards the air-duct, for a predominant part of its depth.

A further object of the present invention is to propose a core-box for the formation of a casting core according to the present invention.

This object is achieved by a core-box comprising at least two half core-boxes of partially complementary shape, the half core-boxes facing one another and being in contact with one another, defining an internal cavity of the core-box, the cavity comprising a central shell-shaped portion, a connecting portion, and a substantially annular disk-shaped portion which opens to the, exterior through a substantially circular duct, the central portion being connected to the outer portion by means of the connecting portion, characterized in that the cavity has the shape of the casting core according to claim 1.

For a better understanding of the invention, some possible embodiments are described by way of non-limiting example below and are shown in the appended drawings, in which.

Figure 3A:
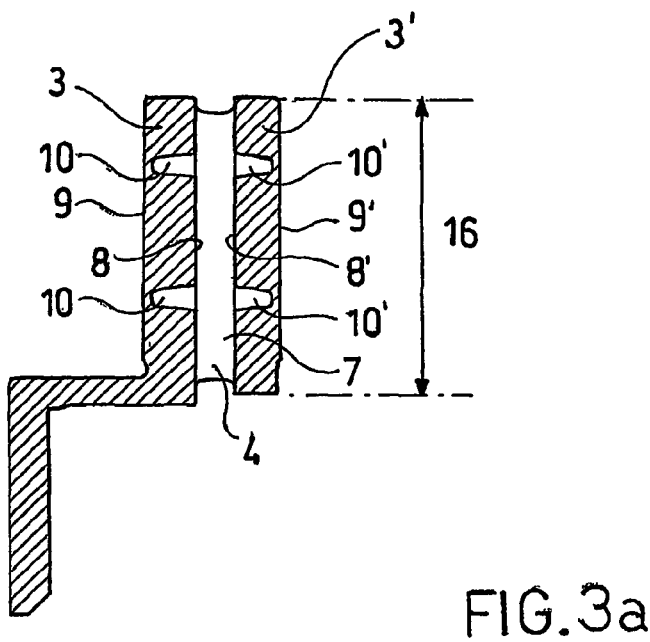
Figure 3B:
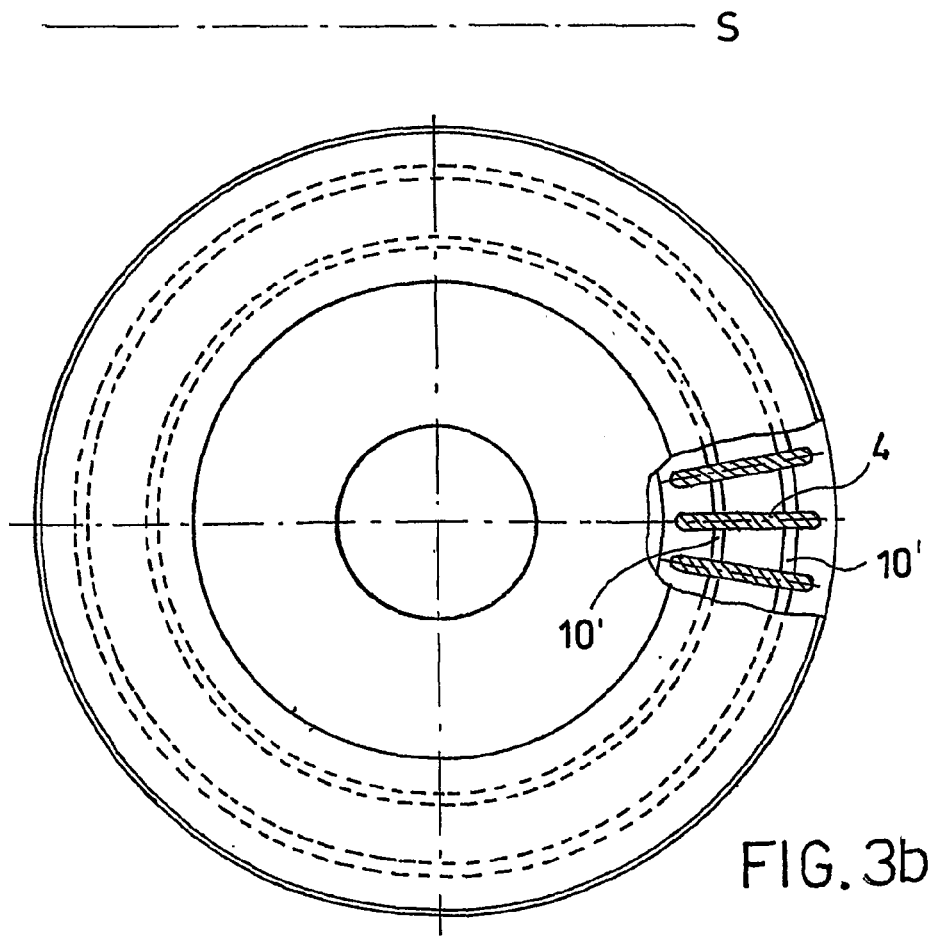
Figure 4A:
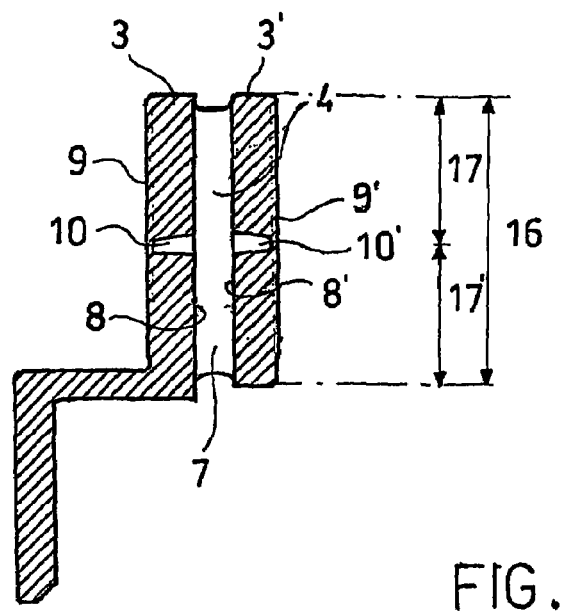
Figure 4B:
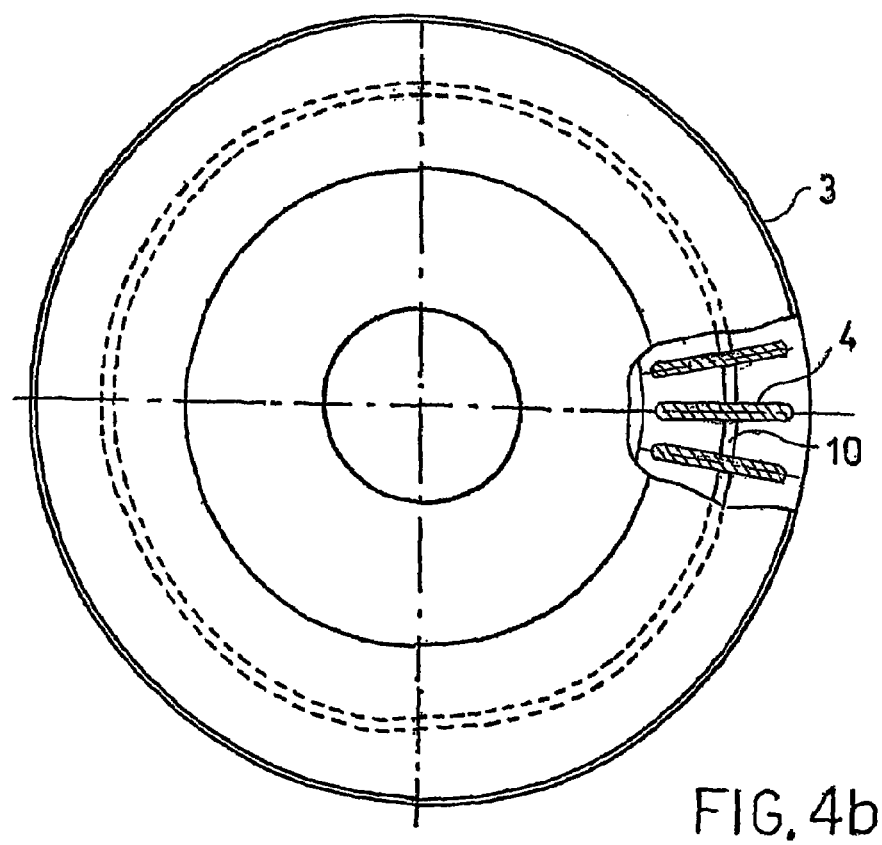
Figure 5A:
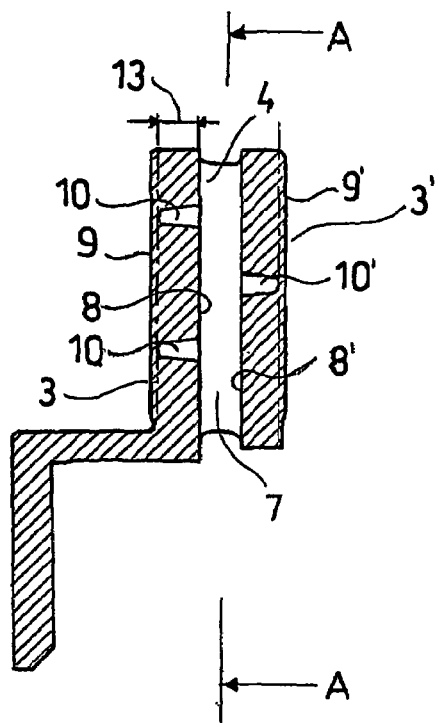
Figure 5B:
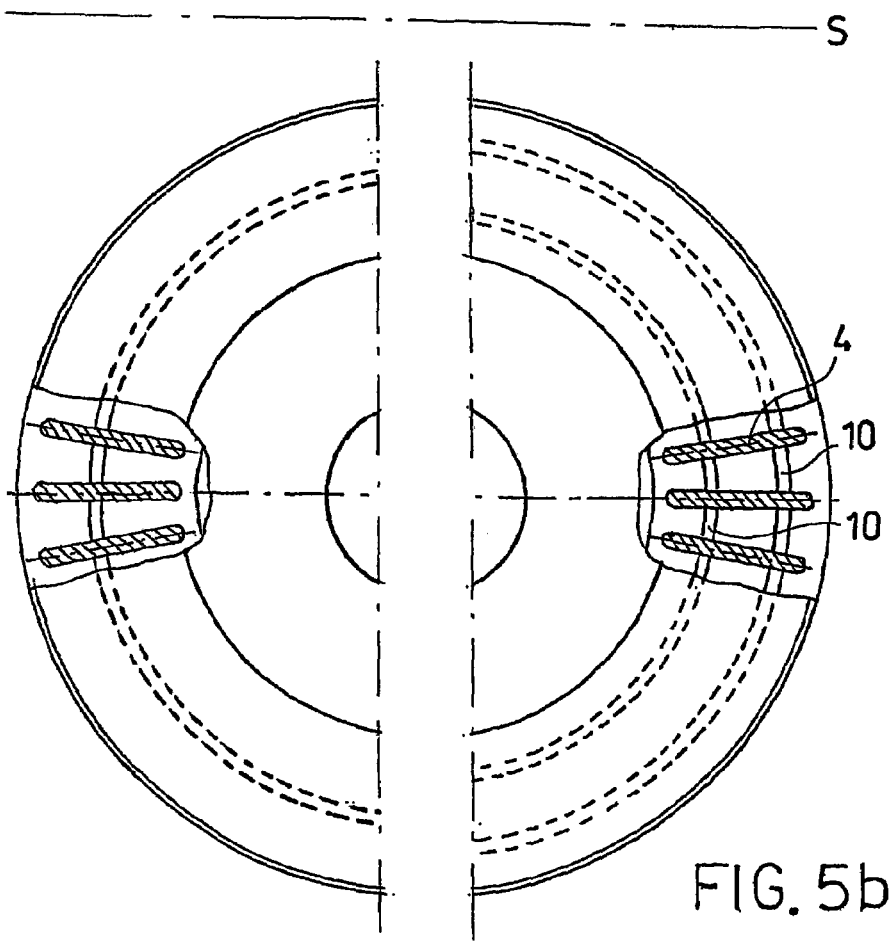
Figure 6:
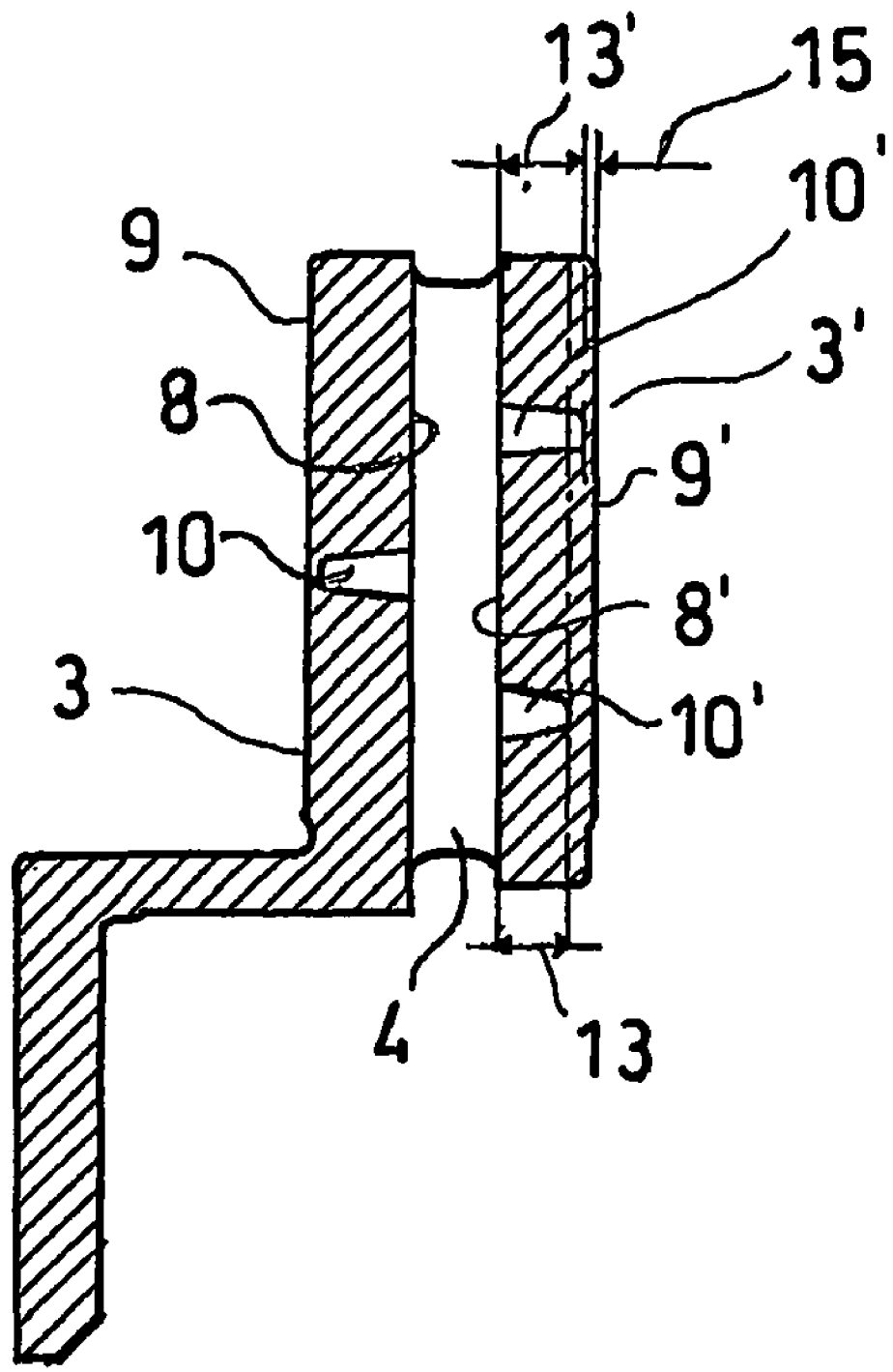
Figure 7A:
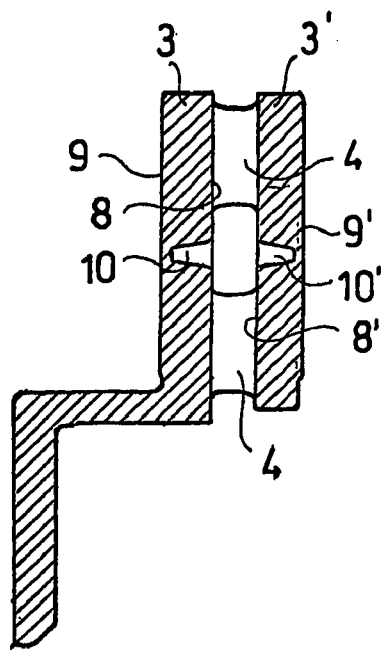
Figure 7B:
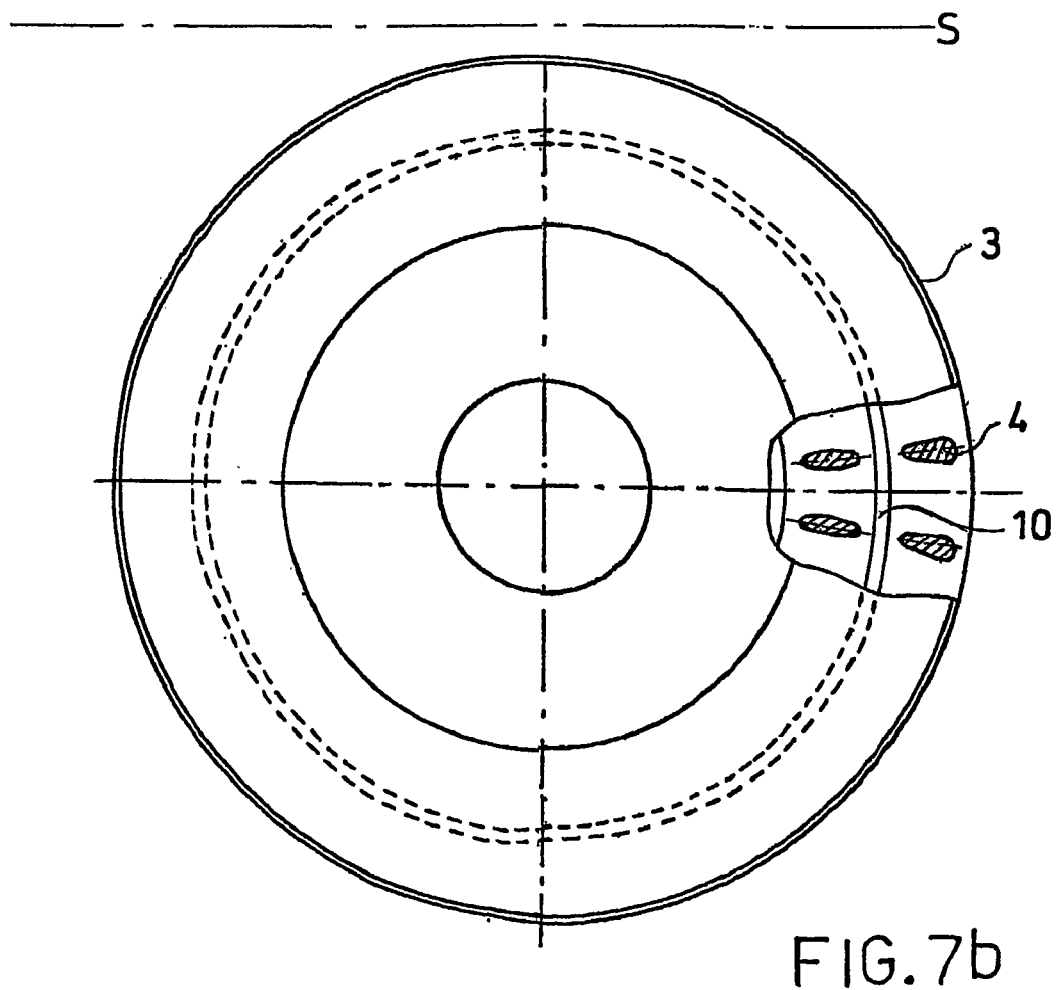
Figure 10A:
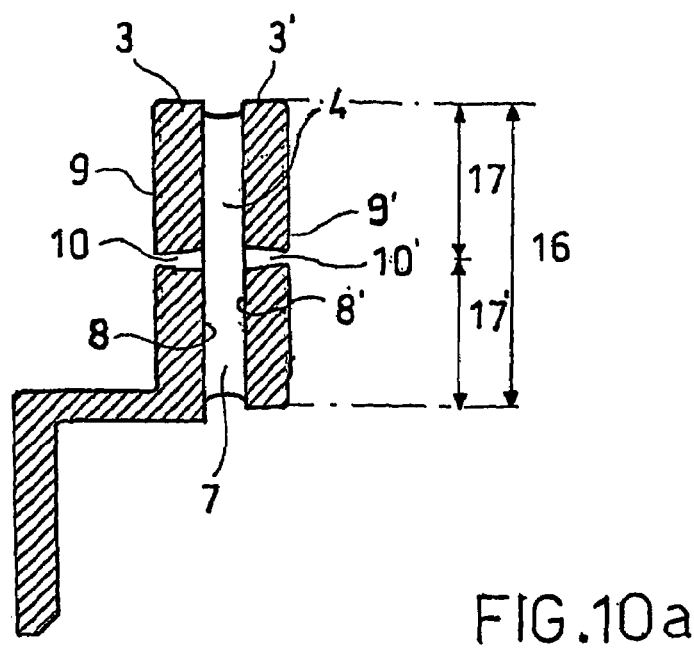
Figure 10B:
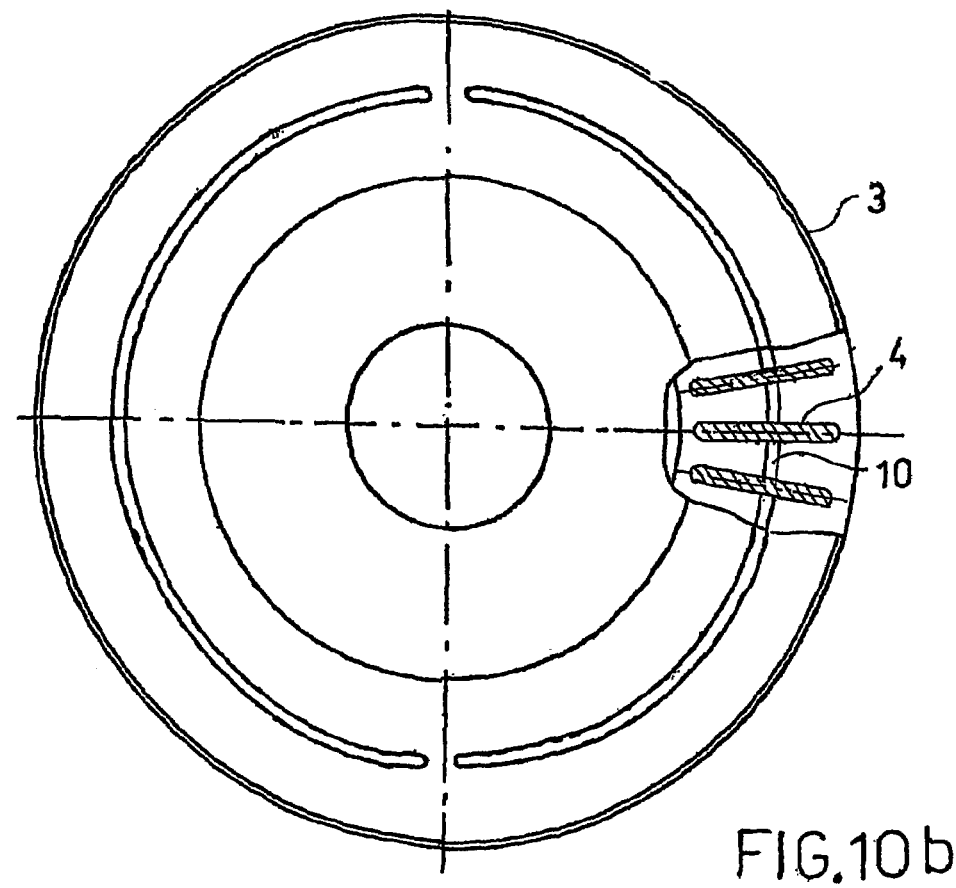
Figure 11:
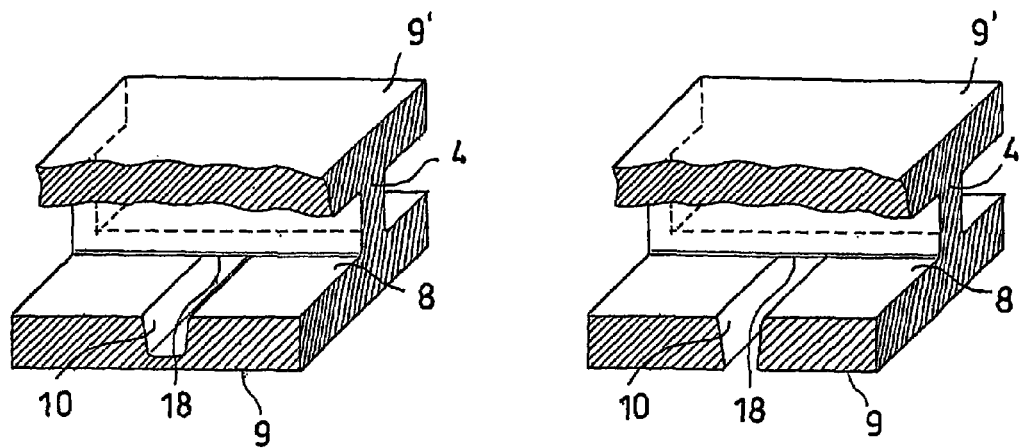
Figure 12:
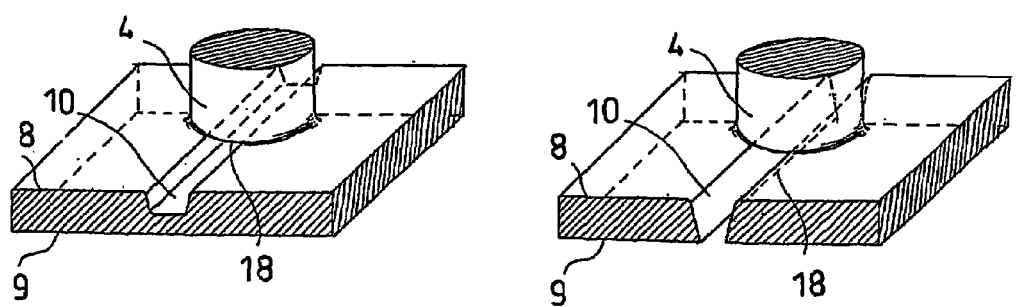
Figure 13:
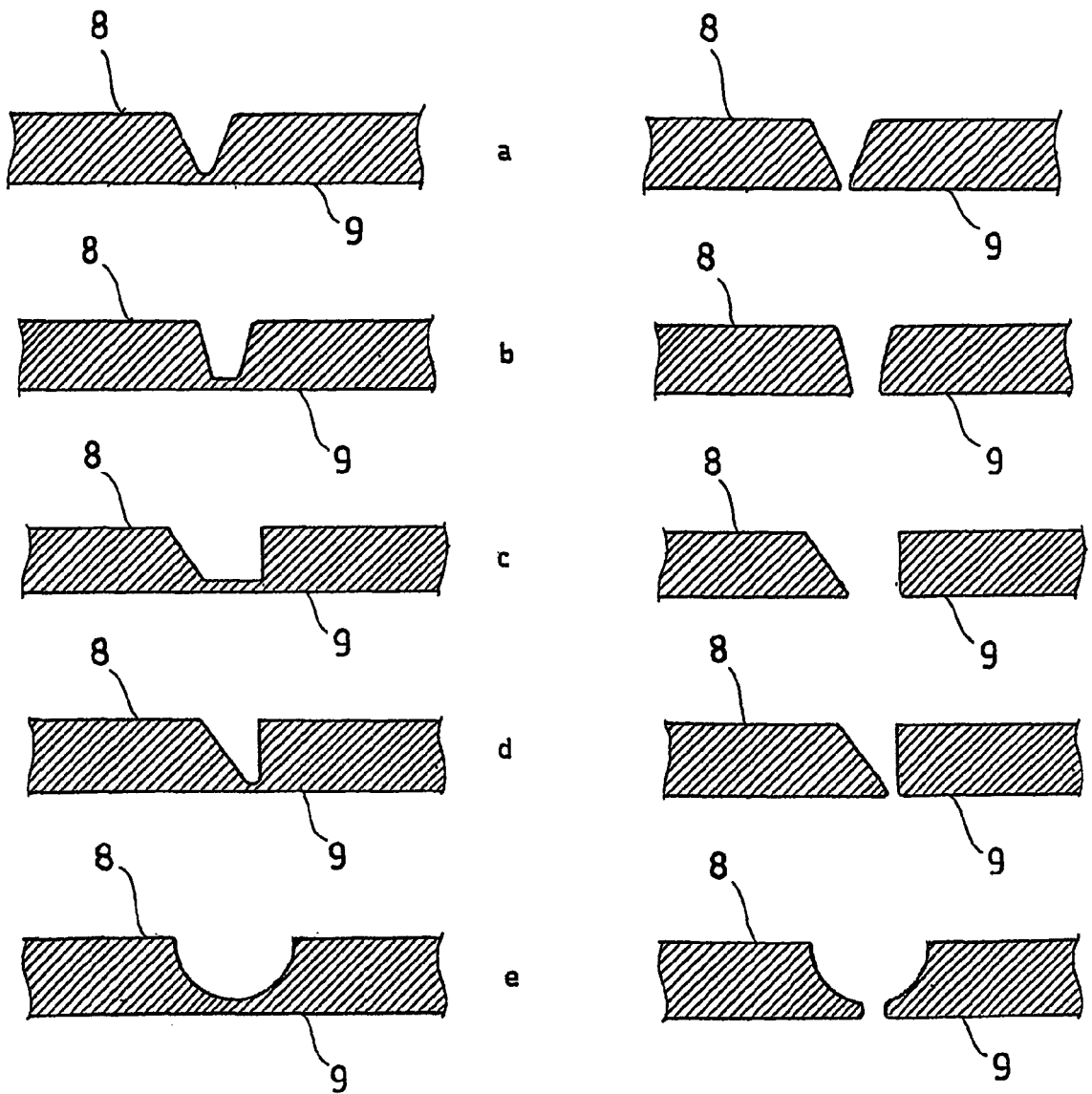
Figure 14:
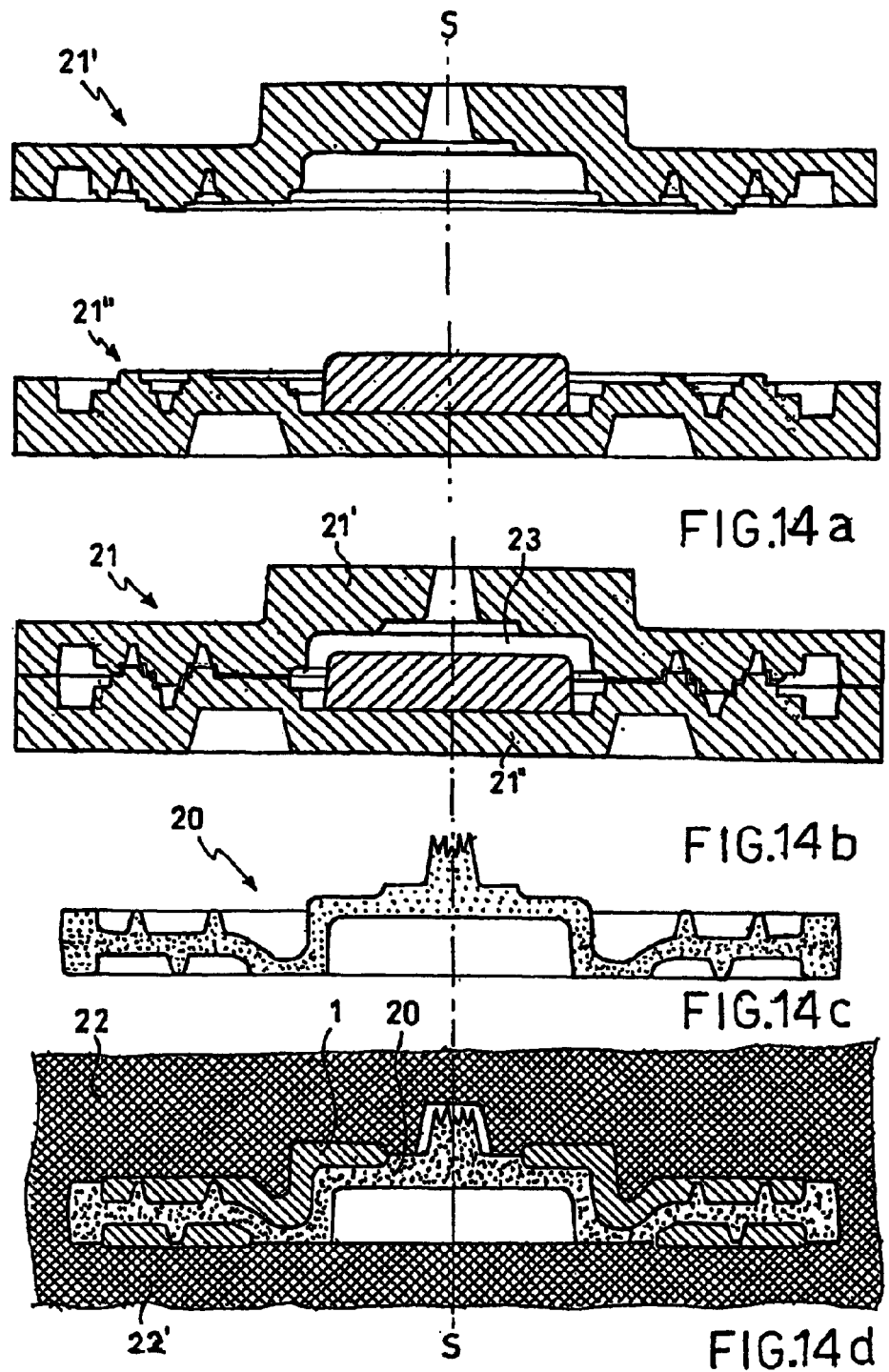
Figure 15:
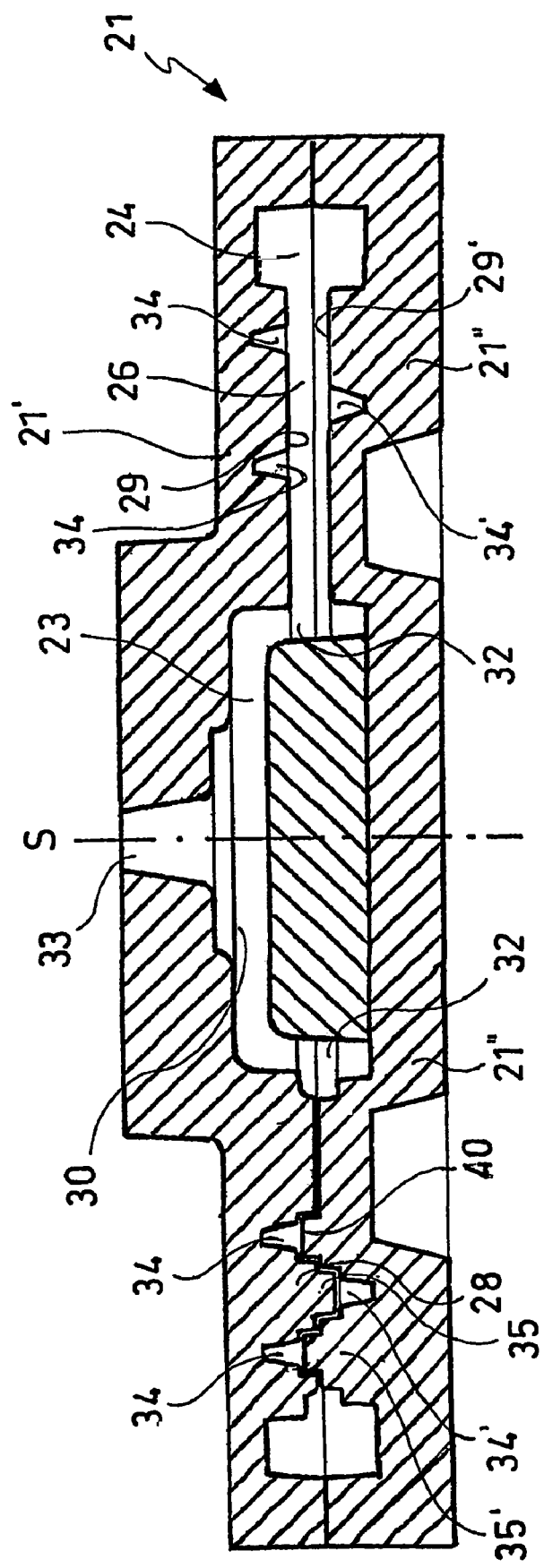
Figure 16A:
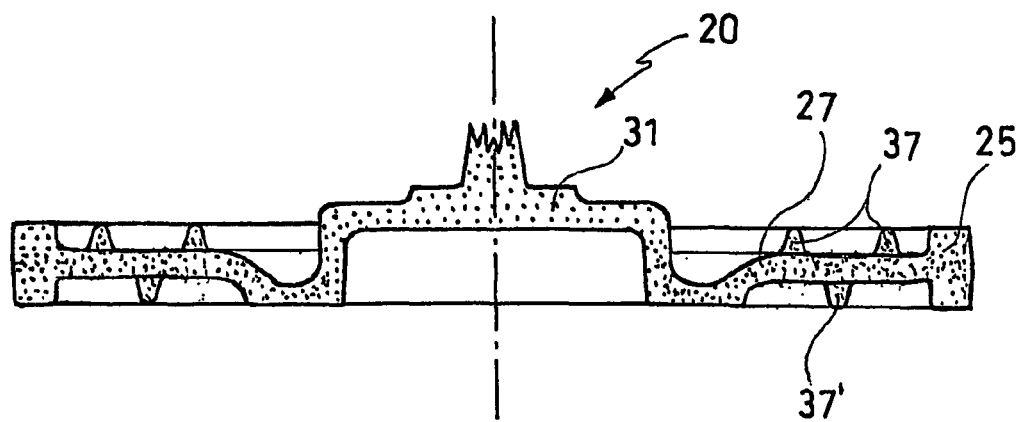
Figure 16B:
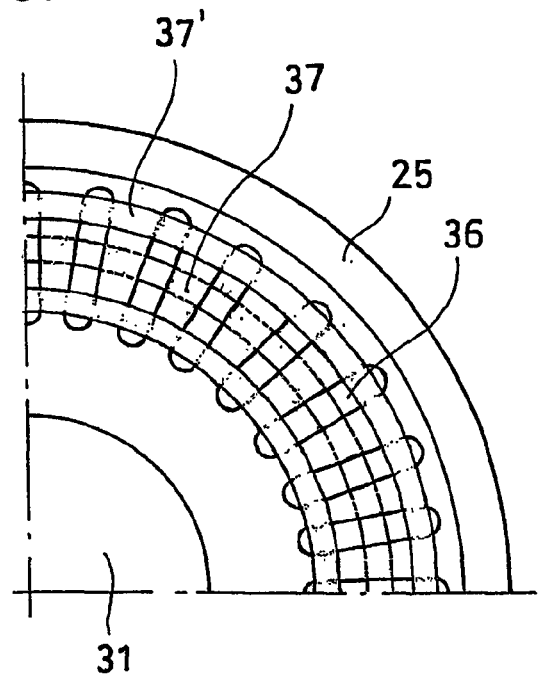
Figure 17:
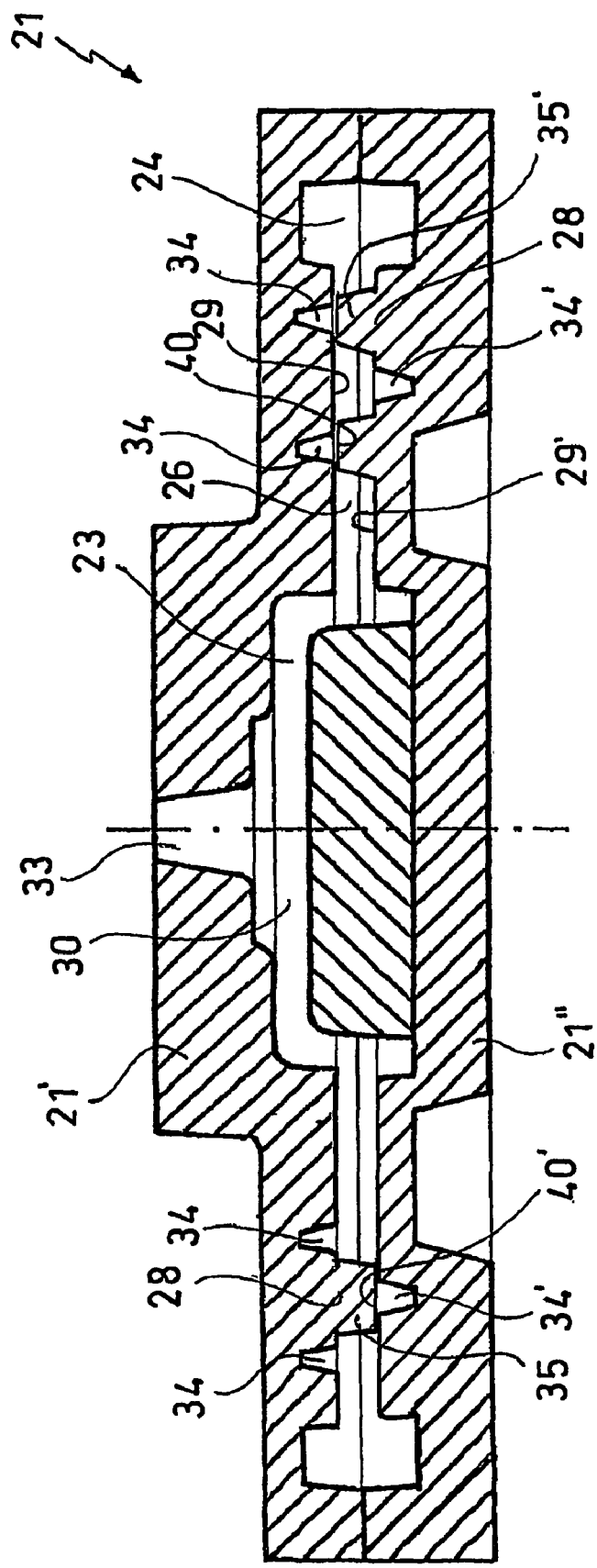
Figure 18A:
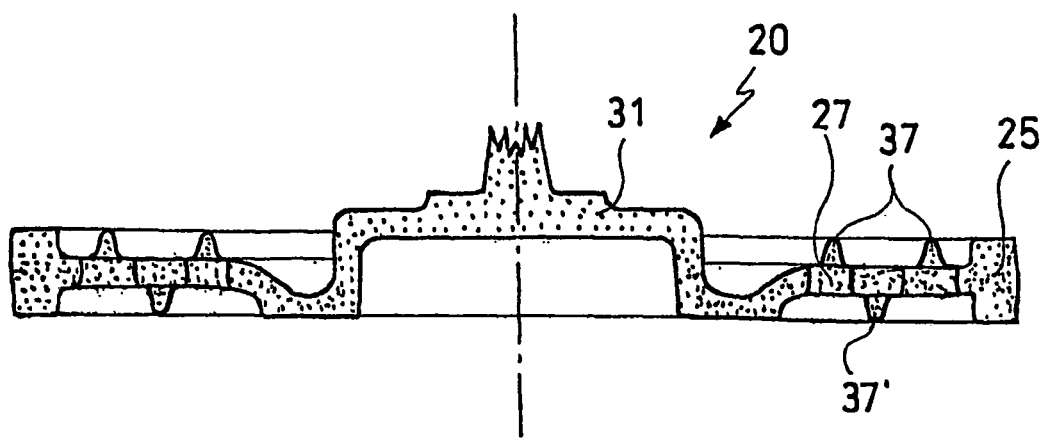
Figure 18B:
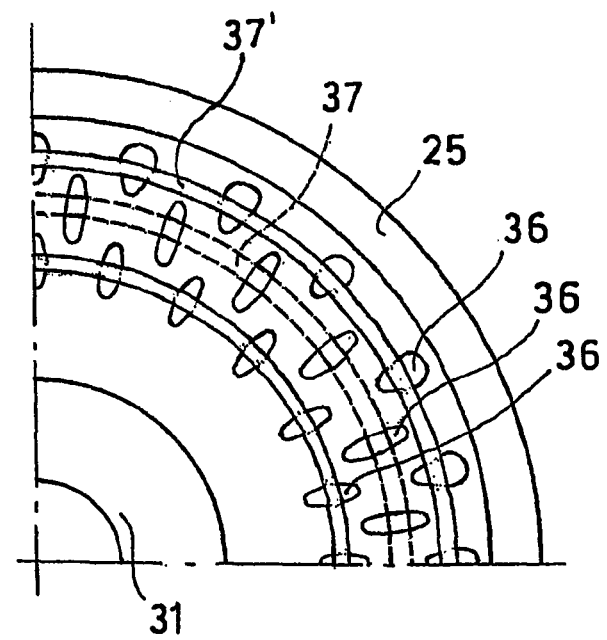
Figure 20A:
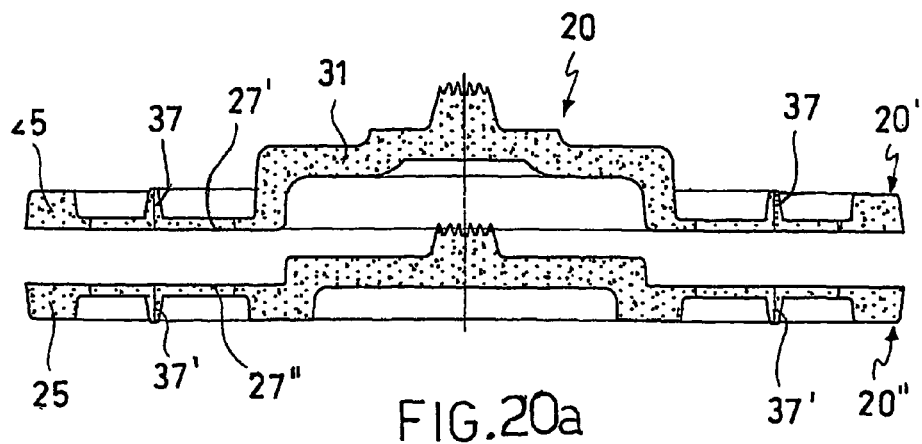
Figure 20B:
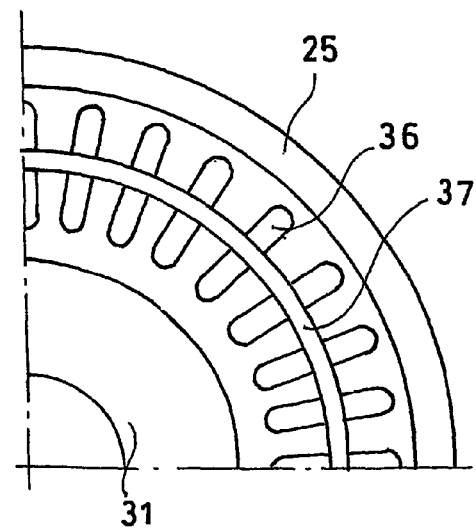

FIG. 3a shows, in radial section, a first brake disk produced by means of a core according to the invention, FIG. 3b shows the brake disk of FIG. 3a in a partially-sectioned front view, FIG. 4a shows, in radial section, a second brake disk produced by means of a core according to the invention, FIG. 4b shows the brake disk of FIG. 4a in a partially-sectioned front view, FIG. 5a shows, in radial section, a third brake disk produced by means of a core according to the invention, FIG. 5b shows the brake disk of FIG. 5a in a partially-sectioned front view, FIG. 6 shows, in radial section, a fourth brake disk produced by means of a core according to the invention, FIG. 7a shows, in radial section, a fifth brake disk produced by means of a core according to the invention, FIG. 7b shows the brake disk of FIG. 7a in a partially-sectioned front view, FIG. 8a shows, in radial section, a sixth brake disk produced by means of a core according to the invention, FIG. 8b shows the brake disk of FIG. 8a in a partially-sectioned front view, FIG. 9a shows, in radial section, a disk produced by means of a core according to the invention, in which the grooves are open towards the outer surfaces of the plates, FIG. 9b shows the brake disk of FIG. 9a in a partially-sectioned front view, FIG. 10a shows, in radial section, a further brake disk produced by means of a core according to the invention, FIG. 10b shows the brake disk of FIG. 10a in a partially-sectioned front view, FIGS. 11 and 12 show, in perspective views, the regions of intersection between a connecting element and a groove inside a self-ventilated braking band produced by means of a core according to the invention, FIG. 13 shows sections through particularly advantageous embodiments of the grooves inside a self-ventilated braking band, produced by means of a core according to the invention, FIGS. 14a to 14d show, schematically, the production of a self-ventilated brake disk by casting, FIG. 15 shows, in radial section, a first embodiment of a core-box according to the present invention, FIGS. 16a and 16b show, in radial section and in a front view, the casting core produced by means of the core-box of FIG. 15, FIG. 17 shows, in radial section, a second embodiment of a core-box according to the present invention, FIGS. 18a and 18b show, in radial section and in front view, the casting core produced by means of the core-box according to FIG. 17, FIGS. 19a and 19b show, in radial section, a third embodiment of two core-boxes for the production of a core composed of two cores according to the present invention, FIGS. 20a and 20b show, in radial section and in front view, the two cores for the production of a composite core produced by the core-boxes of FIGS. 19a and 19b.

Figure 1:
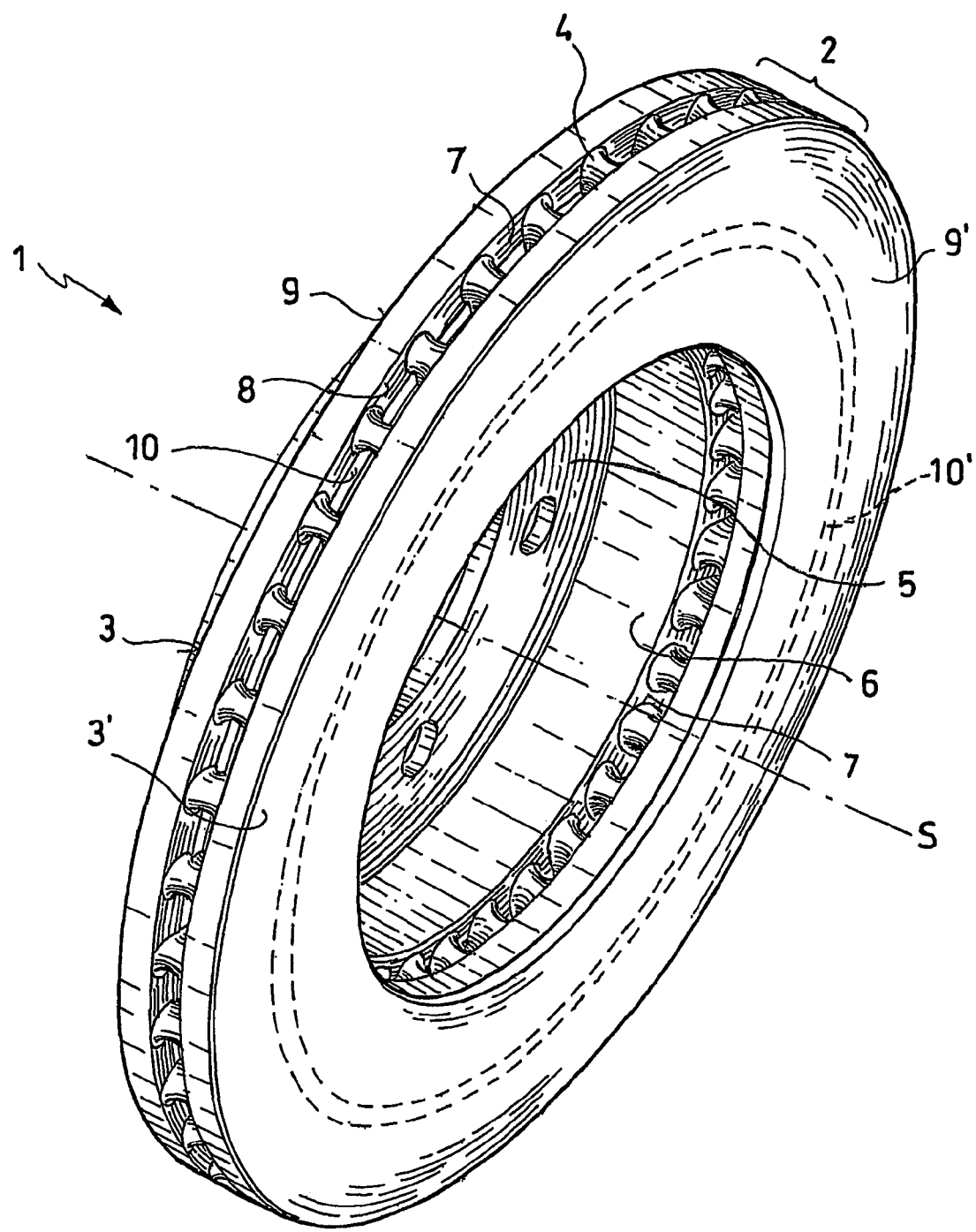
FIG. 1 is an axonometric view of a self-ventilated brake disk.

With reference to FIG. 1, a disk-brake disk is generally indicated 1. The disk 1 extends about an axis of symmetry s. The axis of symmetry s also constitutes the axis of rotation of the brake disk 1. A braking band 2 comprises at least two plates 3 and 3' connected to one another by connecting elements 4. The braking band 2 is supported by the bell 5 by means of a connector 6. The bell 5 is disposed in the centre of the brake disk 1 and can be coupled to a vehicle hub by connecting means. Each braking plate 3, 3' comprises an outer surface 9, 9' and an inner surface 8, 8', remote from the outer surface 9, 9'. The outer surfaces 9, 9' of the plates 3, 3' are the friction surfaces of the brake disk. The inner surfaces 8, 8' of the plates 3, 3' define an air-duct 7.

According to one embodiment of the braking band produced by means of a core according to the invention, at least one of the inner surfaces 8, 8' has a groove 10, 10' which becomes wider from the outer surface 9, 9' towards the air duct 7, as shown, for example, in FIG. 1.

In a braking band produced by means of a core according to the invention, at least one of the grooves 10, 10' extends substantially around a circle concentric with the axis of symmetry s of the brake disk 1.

According to one embodiment of the braking band produced by means of a core according to the invention, all of the grooves 10 are arranged on the two inner surfaces 8, 8' around a circle concentric with the axis of symmetry s of the brake disk 1.

With further advantage, the grooves 10, 10' produced by means of a core according to the invention extend around a circle arranged centrally relative to the width 16 of the braking band 2, dividing the plates 3, 3' structurally into two rings 17 and 17' of equal radial width, as can be seen, for example, from FIG. 4a.

With yet further advantage, all of the grooves 10, 10' around the circle are produced by means of a core according to the invention in a manner such as to be of the same length and to be spaced apart uniformly.

Figure 2:
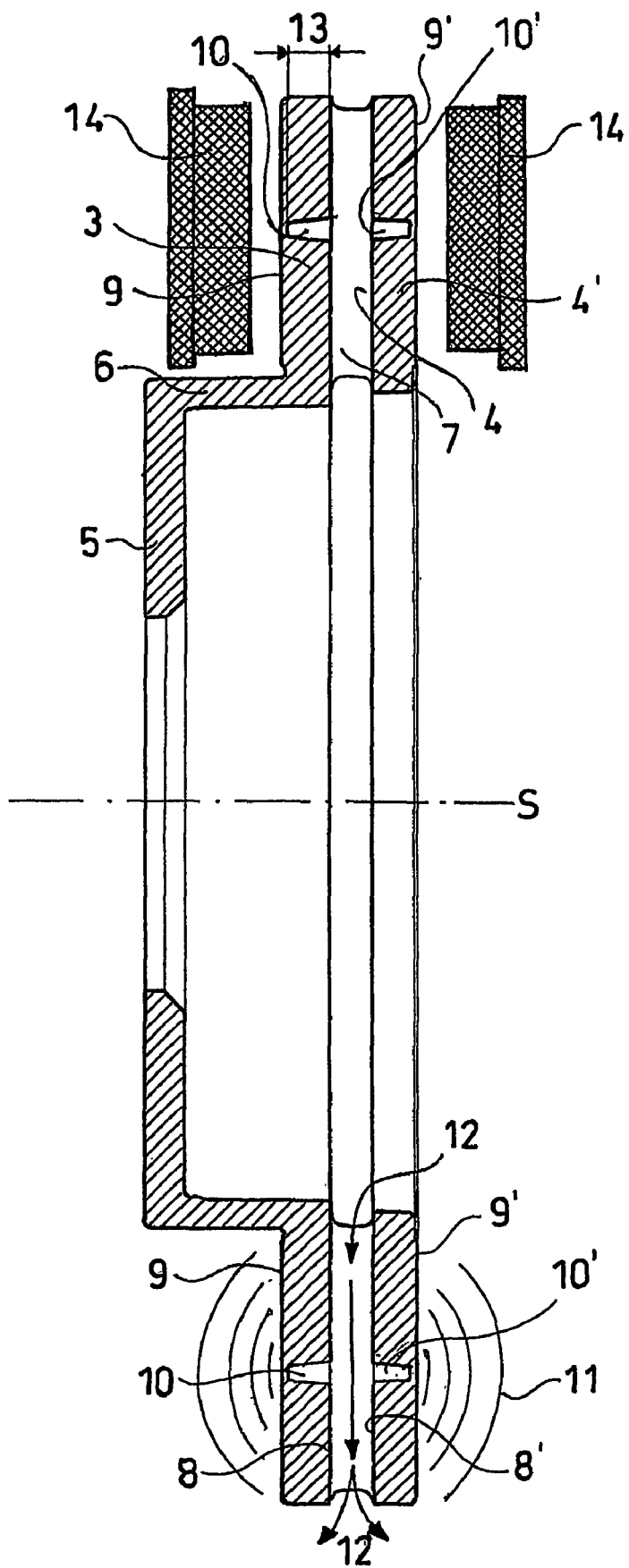
FIG. 2 shows the disk of FIG. 1 in radial section.

The operation of a brake disk 1 with the braking band produced in accordance with the invention is described below with reference to FIG. 2.

During a braking operation, the pads 14 are urged against the friction surfaces 9, 9' of the braking band 2 of the brake disk 1. The friction produces a vibration of the disk which is translated into sound waves 11. The amplitude of the vibration excited increases as the excitation frequency approaches one of the natural frequencies of the disk and fades away as the excitation frequency moves away from the natural frequencies of the disk. By modifying the stiffness of the brake disk by means of grooves 10, 10' which become wider towards the interior of the braking band 2, it is possible to modify the natural frequencies of the disk, moving them away from the frequencies which are excited during a braking operation. The vibrations, and hence the sound waves 11, produced consequently disappear. It has been found that the particular shape of the cross-section of the grooves 10, 10', that is, the fact that they become wider towards the air-duct 7 for a predominant part of their depth, leads to an exceptional sound-damping effect. It has also been found that this effect is further increased as the length of the grooves 10, 10' increases beyond a minimum length equal to five times their width.

FIGS. 3a, 3b show, for example, a brake disk produced by means of a core according to the present invention, in which the grooves 10, 10' are annular and concentric with respect to the axis of symmetry s.

With further advantage, all of the grooves produced by means of a core according to the invention in at least one of the inner surfaces 8, 8' of the braking band 2 are uniformly spaced apart radially.

In a brake disk produced by means of a further core according to the invention and shown in FIGS. 3a and 3b, the inner surfaces 8, 8' of the plates 3, 3' with the respective grooves 10, 10' are arranged to be reflectively symmetrical, thus ensuring a substantially identical distribution of the rigid regions and of the yielding regions, respectively, in the two plates 3, 3'.

In a brake disk produced by means of a further core according to the invention and shown in FIGS. 4a and 4b, the plates 3, 3' of the self-ventilated braking band 2 are connected to one another by means of connecting elements 4 in the form of fins. The connecting elements 4 are oriented predominantly radially with respect to the axis of rotation s of the brake disk 1 and are spaced apart substantially uniformly. Each plate 3, 3' has, on its inner surface 8, 8', an annular groove 10, 10' which extends around a circle arranged centrally relative to the width 16 of the braking band 2. In the regions of intersection between the grooves 10, 10' and the fins 4, the grooves 10, 10' extend beneath the fins 4. In other words, the fins 4 are not interrupted in the intersection regions. Moreover, the angles between the fins 4 and the grooves 10, 10' in the intersection regions are rounded.

In a braking band produced by means of a further embodiment of a core and shown in FIGS. 5a and 5b, the first surface 8 defining the air-duct 7 has annular grooves 10' which are out of alignment with the annular grooves 10' provided in a second, facing surface 8' defining the air-duct 7.

With further advantage, the grooves 10 and 10' of the first surface 8 and of the second surface 8' are distributed radially at regular intervals and the grooves 10 of the first surface 8 are offset by one half interval relative to the grooves 10' of the second surface 8'.

It is possible, by means of a core according to the invention, to form between the plates 3 and 3' of the braking band 2 any number of connecting elements 4 with cross-sections of any shape for ensuring both rigid coupling between the plates 3 and 3' and the cooling air-flow 12 within the air-duct 7. In the embodiment shown in FIGS. 5a and 5b, the two plates 3 and 3' are connected by shaped fins 4 which define a plurality of ventilation ducts that are substantially radial relative to the axis of rotation s.

A further embodiment of the core enables grooves 10, 10' of different depths 13 and 13' to be produced, as can be seen, for example, from FIG. 6. The worn thickness of the plate 3' at the moment at which one of the grooves 10' opens visibly towards the exterior is indicated 15.

In a brake disk produced by means of a further core according to the invention, at least one of the grooves 10, 10' is arranged to have a depth 13 equal to the minimum permissible thickness of the respective worn braking plate 3, 3'.

With further advantage, as can be seen from FIG. 6, it is possible to form, in addition to the grooves 10, 10' of the above-mentioned depth 13 equal to the minimum permissible thickness of the worn plate, further grooves with a depth 13' greater than the depth 13, the depth 13' being indicative of a state of wear which requires replacement of the brake disk 1 within a predetermined period of time.

FIGS. 7a and 7b show an embodiment of a disk brake produced by means of a core according to the present invention in which the plates 3 and 3' of the braking band 2 are connected to one another by elements 4 of substantially circular, oval, or rhombic cross-section. The elements 4 are arranged along circles around the axis of rotation s and form a succession of annular series. One or more annular grooves 10, 10' are disposed in the spaces between the series of connecting elements 4.

FIGS. 8a and 8b show a further disk produced by means of a core according to the invention, in which the plates 3, 3' of the braking band 2 are connected to one another by means of substantially oval-sectioned elements 4. The elements 4 are arranged along circles around the axis of rotation s and form a succession of annular series. In the specific embodiment, all of the connecting elements of the same annular series have identical cross-sections. The shapes of the cross-sections of the connecting elements may vary from one annular series to another. Still with reference to FIG. 8b, the connecting elements 4 of the inner annular series have an oval cross-section having smaller dimensions than the elements of the intermediate series. The connecting elements 4 of the intermediate annular series also have an oval cross-section, but of larger dimensions than the connecting elements of the inner and outer annular series. The connecting elements 4 of the outer annular series have a substantially oval cross-section which becomes wider radially towards the outer circumference of the braking band. Two annular grooves 10 are formed in the inner surface 8 of the plate 3, in the region of the inner and outer series of connecting elements 4, and extend beneath these connecting elements in the intersection regions. A third annular groove 10' is formed in the inner surface 8' of the plate 3', in the region of the intermediate series of connecting elements, and extends beneath these connecting elements in the intersection regions.

In a braking band produced by means of a further core according to the invention, the grooves 10, 10' extend throughout the thickness of the respective plates 3, 3', as can be seen, for example, from FIGS. 9a and 9b.

In FIGS. 10a and 10b, the plates 3, 3' of the self-ventilated braking band 2 are connected to one another by means of fin-shaped connecting elements 4. The connecting elements 4 are oriented substantially radially relative to the axis of rotation s of the brake disk 1 and are spaced apart substantially uniformly. Each plate 3, 3' has a respective annular groove 10, 10' which extends around a circle arranged centrally relative to the width 16 of the braking band 2. The substantially trapezoidal cross-sections of the grooves 10, 10' become wider towards the air-duct 7 and are rounded in the regions of the outer and inner surfaces 9, 9' and 8, 8'. The outer opening of each groove 10, 10' is interrupted by two protuberances which constitute an edge for cutting friction material projecting from the pads. In the intersection regions between the grooves 10, 10' and the fins 4, the grooves 10, 10' extend beneath the fins 4.

FIGS. 11 and 12 show, by way of non-limiting example, intersection regions between the connecting elements 4 and the grooves 10 inside the ventilation duct 7, formed by means of casting cores according to the invention. The angles 18 between the grooves 10 and the connecting elements 4 in the intersection regions are advantageously rounded.

FIG. 13 shows the cross-sectional profiles of grooves 10 which are particularly suitable for weakening the plates 3 locally in order to reduce the noisiness of the brake disk 1 during braking. The grooves have trapezoidal shapes in cross-section, in accordance with FIGS. 13a to 13d. This particular shape enables the structural discontinuities to be concentrated deliberately along the desired lines.

In a braking band produced by means of a core according to the invention, the oblique sides of the trapezium are inclined at an angle of between 15° and 90° to the longer base. More advantageously, the core has characteristics such as to produce a braking band in which the oblique sides are inclined at an angle of between 45° and 90' to the longer base and, even more advantageously, the oblique sides are inclined at an angle of 85° to the longer base of the trapezium.

The preferred cross-section of the grooves 10, 10' produced by means of a core according to the invention is the shape of an isosceles trapezium, as shown in FIG. 13b.

It can also be seen from FIGS. 13a to 13e that the edges of the grooves are rounded.

The grooves are produced by casting, by means of respective protuberances on the surface of a casting core according to the invention.

The production of a brake disk by casting, by means of a core 20 according to the present invention and the production of the core 20 by means of a core-box 21 according to the invention will be described below with reference to FIGS. 14a to 14d.

A brake disk is normally produced by casting by means of two moulds 22 and 22' (see FIG. 14d) which define the external shape of the rough disk. The moulds 22, 22' are made, for example, of agglomerated moulding sand.

For ventilated disks, in addition to the two moulds 22 and 22', at least one insert, that is, a negative form of the connecting elements 4 between the two plates 3, 3' of the braking band 2, is required. The insert, which is generally known as a core 20, is made, for example, of sand solidified by means of a resin. One or more cores 20 may be used, according to the complexity of the shape to be cast.

The production of the moulds 22, 22' and of the cores 20, respectively, constitute very important production steps because, since they can be used only once, it is necessary to produce the moulds 22, 22' and the core 20 with the smallest possible number of components, thus ensuring that the brake disks 1 are produced at an advantageous cost.

The core 20 is produced by means of at least two half core-boxes 21' and 21" and possibly additional inserts, the number and shape of which are determined in turn by the complexity of the shape of the core 20 (FIGS. 14a to 14c). The shapes of the half core-boxes 21', 21" and of any inserts must be such as to conform to the permissible tolerances for each individual core 20 thus formed and to ensure that the flow of the core material, for example, core sand pre-coated with resin, reaches even the critical regions at the speed necessary to ensure the required compactness.

In order to be able to form the cores 20 at a typical mass-production rate, it is necessary to limit the number of inserts to the smallest possible number and to produce the half core-boxes 21' and 21" in a form which best satisfies the above-mentioned requirements.

FIG. 15 shows a core-box for the production of the casting core 20 shown in FIG. 16. The core-box 21 is constituted by two half core-boxes 21', 21" which have partially complementary shapes and are assembled so as to create, inside the core-box 21, a cavity 23 of the shape of the core 20 of FIG. 16. An outer channel 24 defines the shape of a periphery or support 25 of the core and has a substantially rectangular radial section. An intermediate portion 26 of the cavity 23 is disk-shaped and defines the dimensions of an annular band 27 of the core 20. The intermediate portion 26 of the cavity 23 is interrupted by a plurality of bridge elements 28 which connect two surfaces 29, 29' between which the intermediate portion 26 of the cavity 23 is defined.

In FIG. 15, the bridge elements 28 are distributed around the circumference of the intermediate portion 26 and take the form of dividing walls which extend substantially radially relative to the axis s of the core-box 21. A central portion 30 of the cavity 23 is formed as a shell substantially defining the profile of a central portion 31 of the core 20. The central portion 30 of the cavity 23 is connected to the annular disk-shaped intermediate portion 26 by means of a connecting portion 32. The upper half core-box 21' has a central opening 33 which enables the core material to be injected to form the core 20. At least one of the half-boxes 21', 21" has a groove 34, 34' on its inner surface 29, 29' defining the intermediate portion 26 of the cavity 23. Radial dividing walls 28 are formed by the coupling of respective stepped projections 35, 35' of complementary shape which are present on the inner sides 29, 29' of both of the half core-boxes 21', 21". As can clearly be seen from FIG. 15, the grooves 34, 34' extend through the dividing walls 28.

All of the regions of the cavity 23 are connected to one another, thus ensuring that they are filled with the core material, for example, core sand, from a single opening 33 during the moulding of the core 20.

FIGS. 16a and 16b show the casting core 20 produced by the core-box 21 of FIG. 15. Around its outer circumference, the core 20 has a peripheral portion known as the core bearing portion or simply the support 25. The core 20 also comprises a central portion 31 in the form of a substantially cylindrical cap. The outer edge of the central portion 31 is integral with the inner edge of an annular band 27. The annular band 27 is interrupted by a plurality of openings 36. In FIG. 16, the openings are slot-shaped and extend substantially radially relative to the axis s of symmetry of the core 20. Moreover, the annular band 27 has one or more protuberances 37, 37' in the region of the grooves 34, 34' which are present on the surfaces 29, 29' of the half core-boxes 21', 21" in FIG. 15.

The production of a brake disk according to the present invention is explained below with reference to FIGS. 14a to 14c.

After the two half core-boxes 21', 21" have been brought together to form the core-box 21, the core material is injected into the cavity 23 through the injection opening 33, the half core-boxes 21', 21" having been heated beforehand. The material completely fills the cavity 23, flowing from the innermost diameter towards the outermost diameter. As the coating resin is polymerized, the core sand permanently adopts the shape of the cavity 23, that is, it becomes the core 20. After the core 20 has set, the core-box 21 is opened by moving the half core-boxes 21' and 21" apart, releasing the core 20 from the cavity 23. This operation is particularly easy, in spite of the fact that the core has protuberances 37, 37' for defining the shapes of the grooves 10, 10'. This is because each of the protuberances 37, 37' has a cross-section which is tapered away from the annular band of the core which constitutes the ventilation duct of the brake disk. In other words, each of the protuberances has positive draft angles which facilitate the removal of the core from the mould.

In order to cast a rough brake disk, the core 20 is placed in the half-mould 22', after which the half-mould 22 is positioned so as to form the casting mould. The core 20 is kept centred and in position by the core bearing portion 25 which is positioned in suitable seats provided in the half-moulds 22 and 22'.

The cavities inside the mould thus formed define the shape of the rough brake disk. During casting, the liquid iron or other material suitable for forming a brake disk is poured into the cavity through a feed duct, of known type and therefore not described, and sets rapidly, transmitting its heat to the moulding sand. Controlled cooling then takes place to prevent the formation of residual tensions in the brake disk. The sand of the two half-moulds 22, 22' and the core sand, which has become very fragile because of the high temperature to which it is subjected during the casting, is broken up and removed from the rough disk by vibration. The brake disk is then machined in the usual manner.

An advantageous variant of the invention provides for the formation, inside the air-duct 7, by casting, of grooves 10, 10' of a depth less than the thickness of the plates 3, 3' of the rough brake disk and greater than the thickness of the plates of the finished brake disk. The outer layer of the plates 3, 3' is removed during the machining of the outer surfaces 9, 9', for example, by turning, and the grooves 10, 10' are consequently opened to the exterior.

Naturally, variants and/or additions may be provided for the embodiments described and illustrated.

For example, the bridge elements 28 present in the core-box 21 and the respective openings 36 in the annular band of the casting core may have any shape and arrangement suitable for the production of the connecting elements 4 between the above-described plates 3 and 3' of a self-ventilated braking band 2.

The grooves 34, 34' present in the inner surfaces 29, 29' of the core-box 21 and the respective protuberances 37, 37' on the annular band 27 of the core 20 may adopt any shape and arrangement suitable for the production of the above-described grooves 10, 10' inside the air-duct 7 of a ventilated braking band.

In FIGS. 15 and 17, the grooves 34, 34' in the first half core-box 21' and in the second half core-box 21" are annular and are distributed radially at regular intervals and the grooves 34 of the first half-box 21' are offset by one half interval relative to the grooves 34' of the second half box 21". The shape and distribution of the grooves 34, 34' lead to a similar shape and distribution of the protuberances 37, 37' on the annular band 27 of the core, shown in FIGS. 16a and 16b.

The bridge elements 28 are formed by respective projections 35, 35' of complementary shape present on the surfaces 29, 29' of the half core-boxes 21', 21". The projections have respective contact surfaces 40 which, according to one embodiment, are flat, as shown in FIG. 17, or are shaped with steps, according to FIG. 15. The cross-sections of the projections 35, 35' are also tapered towards their ends so that the core 20 can be removed from the half core-boxes 21', 21" after it has set.

In the intersection regions between grooves 10, 10' and connecting elements 4 of the braking band 2, the cross-section of each groove 10, 10' is defined by a portion of the protuberance 37, 37' which is disposed over the openings 36 in the annular band 27 of the core. The cross-section of this portion is in turn defined both by the inner sides of the grooves 34, 34' in one of the two half core-boxes and by the contact surface 40 of the respective projection 35, 35' projecting from the opposed half core-box 21', 21", as can clearly be seen from FIGS. 15 and 17.

FIGS. 19a and 19b show, in radial section, the core-boxes 21 for the moulding of a casting core 20 which is composed of two individual cores 20' and 20" and is used for the casting of a braking band 2 in which the inner surfaces 8, 8' of the plates 3, 3' with the respective grooves 10, 10' are substantially reflectively symmetrical, as can be seen, for example, from FIGS. 4a and 4b. The use of two cores is necessary in this case since the core 20 as a whole has a shape such as to prevent its removal from the half core-boxes 21' and 21" after it has been moulded. The projections 35, 35' in the half core-boxes 21' and 21", which define the shapes of the openings 36 in the annular band 27 of the core and consequently the shapes of the connecting elements 4 between the plates 3 and 3' of the disk which, in this embodiment, are fins extending substantially radially relative to the axis of symmetry s of the brake disk 1, are clearly visible.

FIGS. 20a and 20b show the composite core 20 produced by the core-boxes 21 of FIG. 19. The composite core 20 comprises a first half-core 20' and a second half-core 20" in which the annular band 27' of the first half core 20' has a shape which is substantially reflectively symmetrical with respect to the annular band 27" of the second half-core 20".

A braking band for a disk-brake disk produced by means of a core according to the invention has many advantages.

The particular shape of the cross-sections of the grooves, that is, the fact that they become wider towards the air-duct for a predominant part of their depth, leads to an exceptional sound-damping effect.

When the grooves are of a depth less than the thickness of the plates and are completely within the braking band so that they do not affect the braking surfaces on the outer side of the braking band, it is possible to form the grooves precisely in the desired positions and with the size most suitable for the purpose of advantageously modifying the dynamic characteristics of the brake disk, without affecting the friction process between the surfaces of the disk and of the pads which are in contact during braking.

The arrangement of the grooves in the surfaces defining the air-duct inside the braking band enables the outer surfaces to be machined easily and avoids the machining necessary to produce the grooves, with clear savings in terms of time and costs.

The production of the grooves by casting, by means of protuberances on the annular band of the core, avoids the cutting of the connecting elements between the plates, which is inevitable during the production of the grooves from the exterior. This consequently prevents both the formation of sharp edges and the weakening of the connecting elements, thus eliminating the disadvantages mentioned with reference to the prior art.

The production of the grooves in the desired shape and arrangement on the inner surfaces defining the air-duct and remote from the outer braking surfaces avoids both the use of special pads and the deposition of abrasive material, as occurs in the grooves of the prior art.

A braking band produced by the method and with the tools according to the invention also provides an indication of the state of wear of the brake disk having plates with grooves on the inner surface remote from the outer braking surface and of a depth such as to open visibly towards the outer surface at the moment when a predefined value of the wear of the braking plates is reached. For example, grooves with different arrangements and depths provide an indication of the current state of wear of the brake disk and/or of the reaching of the maximum permissible wear of the brake disk.

A further advantage relates to the cooling of the brake disk having a braking band produced in accordance with the present invention. In fact it has been seen that, as well as increasing the cooling surfaces, the grooves in the surfaces defining the air-duct inside the braking band also create turbulence in the air-flow which in turn favours the exchange of heat between the plates and the air, thus achieving improved cooling of the disk.

With grooves which extend throughout the thickness of the plate, their particular cross-sectional shape, which is tapered towards the friction surface of the braking band, prevents the deposition of abrasive material from the pads and favours the breaking-up of material projecting from the pads in the region of annular grooves. Uneven wear of the pads is consequently prevented. The production of projections which can cut the material projecting from the pads even prevents the initial formation of any projection in the region of the annular grooves rather than breaking it up, by virtue of the cross-sectional shape of the grooves.

The braking band 2 and the bell 5 may also be produced in two separate parts which can be coupled with one another.

Naturally, in order to satisfy contingent and specific requirements, a person skilled in the art may apply to the method and to the tools 20, 20', 20", 21, 21', 21", 22, 22' according to the present invention for producing a braking band 2 further modifications and variations all of which, however, are included within the scope of protection of the invention as defined by the appended claims.

The invention claimed is:

1. A core-box comprising at least two half core-boxes of partially complementary shape, the half core-boxes facing one another and being in contact with one another, defining an internal cavity of the core-box, the cavity comprising a central shell-shaped portion, a connecting portion, and a substantially annular, disk-shaped, intermediate portion which opens to the exterior in a substantially circular duct, the central portion being connected to the intermediate portion by means of the connecting portion, characterized in that the cavity has the shape of a casting core of a braking band, the band having at least two plates connected to one another by connecting elements, in which the space between the plates forms an internal air-duct, defined by surfaces, for the cooling of the braking band, characterized in that the core is suitable for forming, in at least one of the surfaces defining the air-ducts, at least one groove which extends substantially around a circle concentric with a rotational axis of the disk and has a cross-section which becomes wider, towards the air-duct for a predominant depth of the groove, said core comprising:

an annular band having the shape of the air-duct, at least one protuberance disposed on the annular band and tapered outwardly for a predominant portion of its height, said protuberance defining the shape of said groove, a plurality of openings interrupting said annular band, said openings defining the shape of said connecting elements, wherein a portion of the protuberance is disposed over the openings and defines the cross-section of the groove in an intersection region between the groove and a connection element, such that the groove extends beneath the connecting elements between the two plates of the braking band.

2. A core-box for fabricating a casting core for a braking band of a disk brake, said core box comprising at least two half core-boxes of partially complementary shape, the half core-boxes can be brought in contact with one another to define an internal cavity of the core-box, the cavity comprising:
- a central shell-shaped portion,
- a connecting portion, and
- a substantially annular, disk-shaped, intermediate portion which opens to the exterior in a substantially circular duct,
- wherein the central portion is connected to the intermediate portion by means of the connecting portion and the cavity has the shape of the casting core of a braking band and said intermediate portion defines the dimensions of an annular band of said core,
- wherein the intermediate portion of the cavity is interrupted by a plurality of bridge elements which connect two surfaces between which the intermediate portion of the cavity is defined,
- wherein at least one of the half-boxes has a groove on its inner surface defining said intermediate portion of the cavity, said groove defining the shape of a protuberance on said annular band of the core,
- wherein said bridge elements are formed by the coupling of respective stepped projections of complementary shape which are present on the inner surfaces of both of the half core-boxes,
- wherein said groove extends through said bridge elements to define the shape of said core such that the core defines the shape of the braking band in which a groove having the shape of said groove extends beneath connecting elements between two plates of the braking band, said connecting elements having the shape of said bridge elements of the core box.

3. A core-box according to claim 2, wherein the cross-sections of the projections are tapered towards their ends so that the core can be removed from the half core-boxes after it has set.

4. A core-box according to claim 2, wherein an outer channel of said cavity defines the shape of a periphery or support of the core and said outer channel has a substantially rectangular radial cross-section.

5. A core-box according to claim 2, wherein the bridge elements are distributed around the circumference of the intermediate portion of the cavity and take the form of dividing walls which extend substantially radially relative to an axis of the core-box.

6. A core-box according to claim 2, wherein the upper half core-box has a central opening which enables the core material to be injected to form the core.

7. A core-box according to claim 6, wherein all of the regions of the cavity are connected to one another, thus ensuring that they can be filled with the core material from a single opening during the moulding of the core.

8. A core-box according to claim 2, wherein the grooves in the first half core-box' and in the second half core-box are annular.

9. A core-box according to claim 2, wherein the grooves are distributed radially at regular intervals.

* * * * *